United States Patent
Bates et al.

(10) Patent No.: US 8,838,932 B2
(45) Date of Patent: Sep. 16, 2014

(54) POWER ECONOMIZING BY POWERING DOWN HUB PARTITIONS

(75) Inventors: Allen K. Bates, Tucson, AZ (US); Yun Mou, Tucson, AZ (US); Stephen L. Schwartz, Tucson, AZ (US); Pankaj Tandon, Sunnyvale, CA (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/942,853

(22) Filed: Nov. 9, 2010

(65) Prior Publication Data

US 2012/0117350 A1 May 10, 2012

(51) Int. Cl.
*G06F 12/00* (2006.01)
*G06F 3/06* (2006.01)

(52) U.S. Cl.
CPC ........... *G06F 3/0625* (2013.01); *G06F 3/0647* (2013.01); *G06F 3/0686* (2013.01); *Y02B 60/1246* (2013.01); *G06F 3/0634* (2013.01)
USPC ............ 711/173; 711/144; 711/165; 713/320

(58) Field of Classification Search
USPC ........................... 711/173, 114, 165; 713/320
See application file for complete search history.

(56) References Cited

U.S. PATENT DOCUMENTS

| | | | |
|---|---|---|---|
| 7,216,244 B2 | 5/2007 | Amano | |
| 7,346,790 B1 | 3/2008 | Klein | |
| 7,509,444 B2 | 3/2009 | Chiu et al. | |
| 7,539,878 B2 | 5/2009 | Vaglica | |
| 7,702,853 B2 | 4/2010 | Hetzler et al. | |
| 2004/0044842 A1* | 3/2004 | Trimmer et al. | 711/111 |
| 2008/0016390 A1* | 1/2008 | Cannon et al. | 714/6 |
| 2008/0222434 A1 | 9/2008 | Shimizu et al. | |
| 2008/0229025 A1* | 9/2008 | Plamondon | 711/126 |
| 2009/0013137 A1 | 1/2009 | Mizuno et al. | |
| 2009/0228674 A1* | 9/2009 | Ouchi | 711/168 |
| 2009/0254702 A1 | 10/2009 | Kumano et al. | |
| 2009/0271648 A1 | 10/2009 | Ushijima | |
| 2009/0276785 A1 | 11/2009 | Ali et al. | |
| 2010/0122050 A1* | 5/2010 | Hutchison et al. | 711/162 |
| 2010/0185883 A1 | 7/2010 | Hamilton | |
| 2010/0199116 A1 | 8/2010 | Qi et al. | |

* cited by examiner

*Primary Examiner* — Larry MacKall
(74) *Attorney, Agent, or Firm* — Kunzler Law Group (57) ABSTRACT

An approach to power economization in a spoke and hub environment is presented. When a hub receives a data set from a first spoke, the hub writes the data set to a first partition that is associated with the first spoke. After the data transfer is complete, the hub powers down the first partition. If the first spoke sends additional data transfers to the hub while the first partition is powered down, the hub stores the additional data transfers in a second partition. When the first partition is powered up again, the hub moves the data intended for the first partition and that was stored in the second partition. The data is moved from the second partition to the first partition. The hub may monitor the size of the addition data transfers. If the data transfer is large, the hub may power up the first partition, write the data in the first partition, and move to the first partition any data that was intended for the first partition but written to the second partition while the first partition was powered down.

11 Claims, 5 Drawing Sheets

POWER ECONOMIZING BY POWERING DOWN HUB PARTITIONS

FIELD

The subject matter disclosed herein relates to reducing power usage in spoke and hub data storage configurations.

BACKGROUND

Description of the Related Art

Data storage systems are becoming larger and increasingly commonplace in businesses. As the size of these data storage systems grow, so do the costs and environmental impact of using such systems. Users of electronic devices are becoming increasingly aware of the amount of energy their devices require. Wasted energy costs money and also needlessly consumes limited resources.

Often, in a data storage system, components of the system are powered on and using energy even when they are not performing an active role at any given moment. For example, a virtual tape solution may use a hub-and-spoke model. The hub may be partitioned, with each partition associated with a spoke. However, the entire hub is generally kept active in order to allow the spokes to transfer data to the hub, even if not all partitions are in use at a given time.

BRIEF SUMMARY

The present invention allows for improved data transfers. The invention may be realized as an apparatus, a computer program product, a method, a system, or in other forms.

An apparatus for improved data transfer is provided. The apparatus may include a power module, a monitor module, and a transfer module. The apparatus may, in certain embodiments, contain more or fewer modules than those described.

The power module may be configured to power-down a first partition of the hub after a data set sent by a first spoke is written to the first partition. The first partition and the first spoke may be associated with each other. The monitor module may receive a second data set sent by the first spoke and, if the first partition is in power-down mode, write the second data set to another partition (second partition) that is in power-on mode. A transfer module may then transfer the second data set from this second partition to the first partition when the first partition enters power-on mode.

In certain embodiments, the monitor module determines the size of the second data set and compares it to a threshold data set size. If the size of the second data set is less than the threshold data set size, the transfer module may write the second data set to the second partition and later move the second data set to the first partition as described above. If the size of the second data set exceeds the threshold data set size, the monitor module may power-up the first partition such that it is in power-on mode, at which point the transfer module may write the second data set to the first partition.

In certain embodiments, the transfer of data set from the spokes to the hubs is accelerated using transmission control protocol (TCP) acceleration. In certain implementations, the hub may be a component in a virtual tape hierarchy, and may be connected to an archive tape library. In certain embodiments, the partitions are implemented using storage devices that are physically separate from one another. This may allow a certain partition to be powered down (for example, in the case of hard disk drives, by spinning down the disk drives) without affecting any other partition in the hub.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in microcode, firmware, or the like of programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-Ray Disc (BD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fibre cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fibre optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
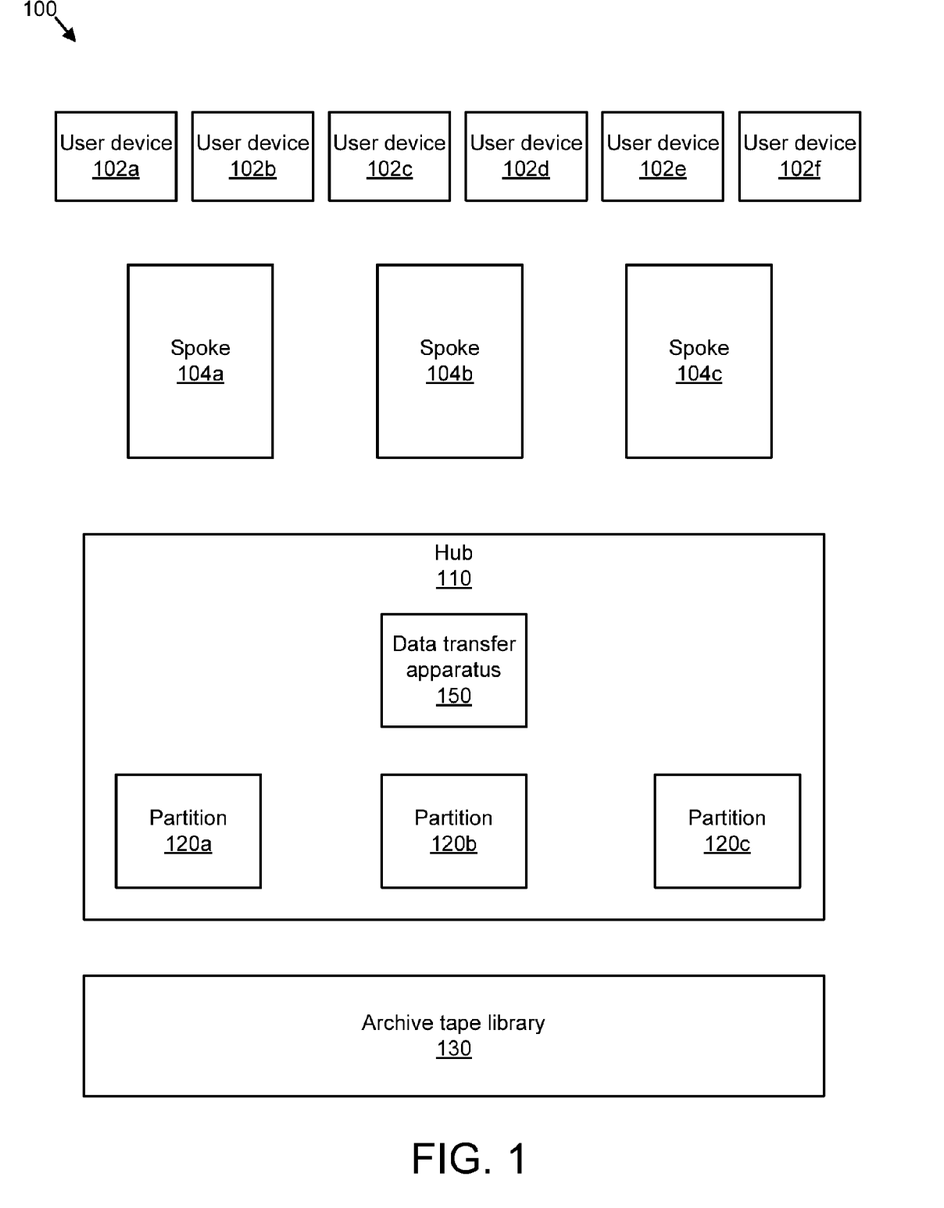
FIG. 1 is a schematic block diagram illustrating one embodiment of a system for powering economization by powering down hub partitions.

FIG. 1 shows one embodiment of a system 100 for improved data transfer. The system 100 is shown as including user devices 102a-f, spokes 104a-c, a hub 110, and an archive tape library 130. The system 100 is simply one example of a configuration in which a data transfer apparatus 150 may provide improved data transfer. The numbers of user devices 102, spokes 104, and partitions 120 may vary in certain implementations.

The user devices 102a-f are computing devices that retrieve and/or store data. The user devices 102a-f may be any number of different computing devices such as, for example, laptops, desktop computers, phones, mobile devices, servers, and storage devices. In certain embodiments, certain user devices 102a-f may be associated with one or more spokes 104a-c. For example, the user devices 102a-b may be associated with the spoke 104a, user devices 102c-d with spoke 104b, and user devices 102e-f with spoke 104c. In certain embodiments, that a user device 102 is associated with a spoke 104 means that the data on the user device 102 is backed up to the spoke 104. Thus, the spoke 104a may back up data from user devices 102a-b. In an alternate embodiment, spokes 104a-c hold less-frequently accessed data from user devices 102a-f, so that user devices 102a-f can hold more frequently accessed data for improved performance.

The spokes 104 are storage devices that store data from one or more user devices 102. The spokes 104 maybe, for example, IBM® TS7720 Virtualization Engine that is in a disk cache only configuration. The spokes 104 may be part of a virtual tape hierarchy that provides storage in the system 100. In certain embodiments, the spokes 104 may be made of one or more physical devices; for example, three TS7200s can be joined in a grid to provide three-way high-availability failover, or to look like one pool of storage. These multiple devices may be considered a single spoke 104.

Any number of pairings of user devices 102 to spoke 104 may be implemented, for a variety of reasons. For example, a company may have multiple offices. A spoke 104a may be associated with a first office, and the spoke 104b with the second office. The spokes 104a and 104b may act as backup storage for the user devices 102 in their respective offices. In another example, a computer animation studio may use a spoke 104a to store visual information, and a spoke 104b to store audio information. Numerous other configurations could also be implemented based on the particular needs of a company. In certain embodiments, a user device 102 is associated with more than one spoke 104; similarly, a spoke 104 may be associated with more than one user device 102.

The hub 110 is a storage device that stores data from one or more spokes 104 on one or more storage devices such as hard disk drives. In one embodiment, the hub 110 is an IBM® TS7740 server. The hub 110 may control virtualization processes such as host connectivity and device virtualization, and hierarchical storage management functions such as storage, replication, and organization of data across physical media and libraries. In certain embodiments, the hub 110 may provide RAID-protected virtual volume disk storage to hold data from the one or more spokes 104 before writing the data to the archive tape library 130. The hub 110 may thus act as a cache. In an alternate embodiment, hub 110 holds less-frequently accessed data from spokes 104a-c, so spokes 104a-c can hold more frequently accessed data for improved performance.

In certain embodiments, the hub 110 stores data on a plurality of hard disk drives. The hard disk drives may be divided into a number of partitions 120. The partitions 120 include subsets of all of the hard disk drives for the hub 110. Thus, the partition 120a may have three hard drives assigned to it, the partition 120b may have three different hard drives assigned to it, and the partition 120c may have yet another three hard drives assigned to it, where three hard drives is the minimum number of hard drives for a RAID-4 or a RAID-5 configuration. The hub 110 may separately power down the partitions 120; thus, partition 120a may be powered down while the partition 120b is powered up. Powering down a partition 120 may involve spinning down the hard disk drives that make up the partition 120.

In one embodiment, the spokes 104 are associated with partitions 120. In one embodiment, each spoke 104 is associated with one partition 120. For example, the data from spoke 104a may be stored on partition 120a. In other embodiments, a many-to-many relationship between spokes 104 and partitions 120 may be established. A spoke 104 may be associated with more than one partition 120, and a partition 120 may be associated with more than one spoke 104.

The system 100 may also include an archive tape library 130. The archive tape library 130 stores data from the one or more partitions 120 on tape media. The archive tape library 130 is communicatively connected with the hub 110. In an alternate embodiment, tape library 130 holds less-frequently accessed data from hub 110, so that hub 110 can hold more frequently accessed data for improved performance.

In certain embodiments, the system 100 is configured to operate as a multi-tiered cache. As data ages, it is moved from the user devices 102 to the spokes 104, then to the hub 110, and finally to the archive tape library 130. Similarly, if a user seeks to access data that is in the archive tape library 130 but not elsewhere in the system 100, the data may be injected into the hub 110 and spokes 104 to improve performance. Those of skill in the art will appreciate the various ways in which data can be cached in a system such as the system 100.

The hub 110 may contain a data transfer apparatus 150. In certain embodiments, the data transfer apparatus 150 selectively powers-down and power-ups partitions 120 in order to maximize energy efficiency. In one embodiment, the data transfer apparatus 150 powers down a first partition 120 after writing a data set from a first spoke 104 to the partition 120 such that the first partition 120 is in power-down mode. The data transfer apparatus 150 may, at a later time, receive a second data set from the first spoke 104 that is intended for the same first partition 120. The data transfer apparatus 150 may write the second data set to a second partition 120 that is in power-on mode if the first partition 120 is still in power-down mode. In this manner, the data transfer apparatus 150 may avoid unnecessarily powering-on the first partition 120. The data transfer apparatus 150 may move the second data set from the second partition 120 to the first partition 120 when the first partition 120 enters power-on mode. In certain embodiments, the data transfer apparatus 150 monitors the first partition 120 to determine when the first partition 120 is in power-on mode.

For example, a spoke 104a may be associated with partition 120a such that data from spoke 104a is stored on partition 120a. The spoke 104a may transfer a first data set to the hub 110, which stores the first data set in partition 120a. The data transfer apparatus 150 may power-down the partition 120a after the transfer of the first data set to partition 120a is complete. The spoke 104a may, at a later time, transfer a second data set to the hub 110. Rather than power-on the partition 120a, the data transfer apparatus 150 may write the second data set to the partition 120b, assuming that the partition 120b is in power-on mode. The data transfer apparatus 150 may transfer the second data set from the partition 120b to the partition 120a at a later time, when the partition 120a is in power-on mode.

In certain embodiments, the data transfer apparatus 150 may determine the size of the second data set and compare it to a threshold data set size. The data transfer apparatus 150 may be configured to write the second data set to the partition 120b if the second data set does not exceed the threshold data set size. If the second data set exceeds the threshold data set size, the data transfer apparatus 150 may power-up the partition 120a and write the second data set to the partition 120a. The data transfer apparatus may again put the partition 120a in power-down mode after writing the second data set.

Figure 2:
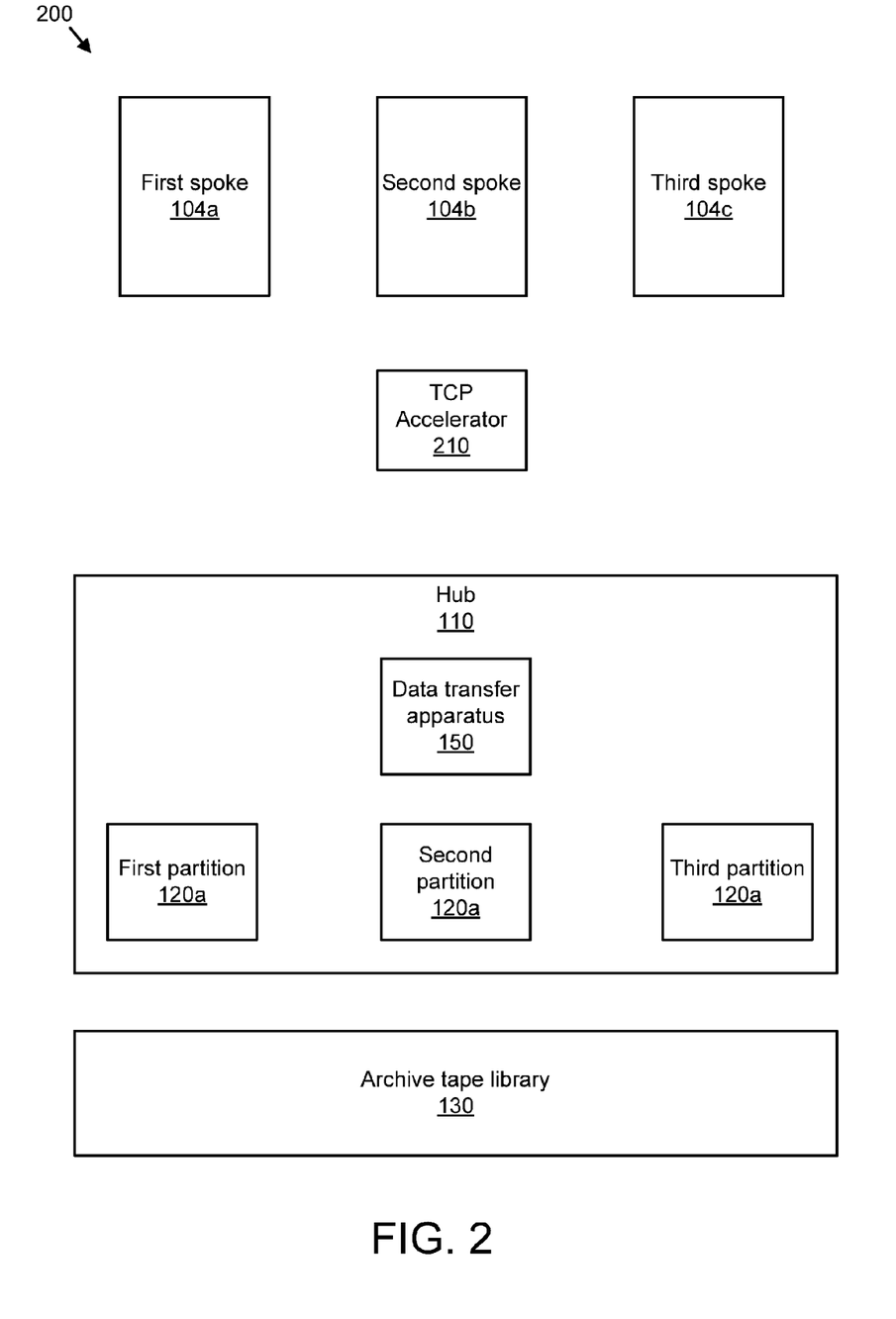
FIG. 2 is a schematic block diagram illustrating a second embodiment of a system for powering economization by powering down hub partitions.

FIG. 2 shows an embodiment of a system 200 for improved data transfer. The system 200 contains the components shown in FIG. 1, with the addition of a transmission control protocol (TCP) accelerator 210. The TCP accelerator (also commonly called a TCP offload engine) is a technology used to offload processing of the TCP/IP stack to a network controller. The TCP accelerator 210 is often incorporated into a network interface card (NIC). The TCP accelerator 210 may speed the transmission of data sets and free up resources of the hub 110. The TCP accelerator 210 may implement various offload strategies, including (but not limited to) parallel stack full offload, host bus adapter full offload, and TCP chimney partial offload. The TCP accelerator 210 accelerates the transfer of data sets from the spokes 104 to the hub 110. In certain implementations, the TCP accelerator 210 may shorten the duration of data transfers by up to 20 times.

In certain embodiments, each spoke 104 is connected to the TCP accelerator 210. The TCP accelerator 210 is connected to the hub 110. The spokes 104 and the hub 110 may, in certain embodiments, communicate through the TCP accelerator 210.

Figure 3:
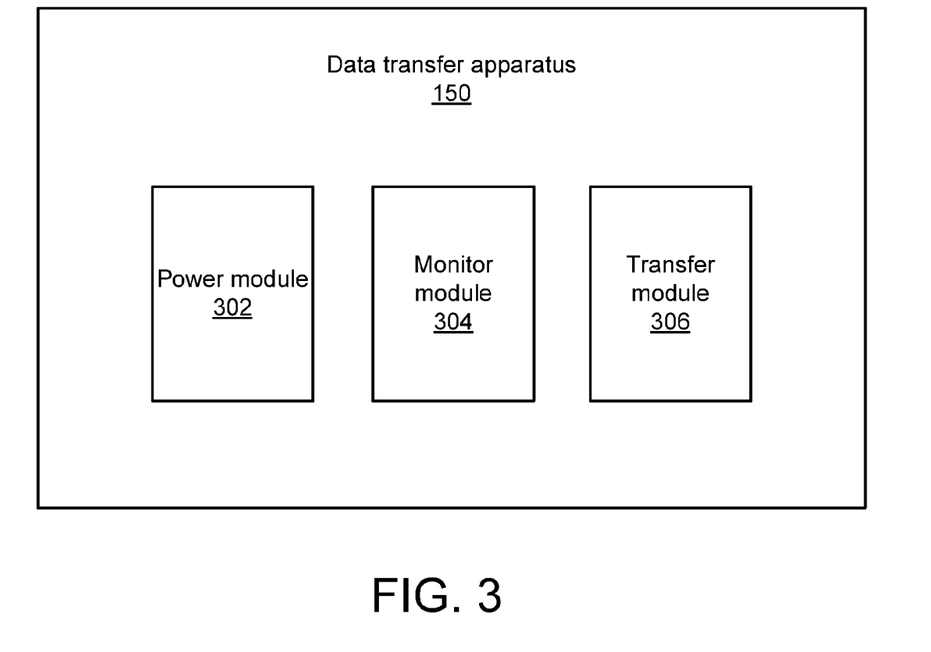
FIG. 3 is a schematic block diagram illustrating one embodiment of a data transfer apparatus.

FIG. 3 shows one embodiment of a data transfer apparatus 150. In one embodiment, the data transfer apparatus 150 includes a power module 302, a monitor module 304, and a transfer module 306. The power module 302 may be configured to power-down a partition 120 (which may be referred to as a first partition 120a) of the hub 110 after writing a data set from a spoke 104 that is associated with the first partition 120a. The first partition 120a may thereby be placed in power-down mode. In certain embodiments, powering down the first partition 120a involves spinning down the hard disk drives that make up the first partition 120a.

The monitor module 304 may be configured to receive a second data set from a spoke 104 associated with the first partition 120a, and to write the second data set to a different partition 120 (which may be referred to as a second partition 120b) of the hub 110 that is in power-on mode if the partition associated with the spoke 104 is still in power-down mode. The transfer module 306 may transfer the second data set from the second partition 120b to the first partition 120a when the first partition 120a entering power-on mode.

In certain embodiments, the monitor module 304 determines the size of the second data set and compares it to a threshold data set size. If the monitor module 304 determines that the size of the second data does not exceed the threshold data set size, the monitor module 304 may proceed with writing the second data set to a second partition 120b that is in power-on mode. If the size of the second data set exceeds the threshold data set size, the monitor module 304 may power-up the first partition 120a such that the first partition 120a is in power-on mode, and the transfer module 306 may then transfer the second data set to the first partition 120a.

Figure 4:
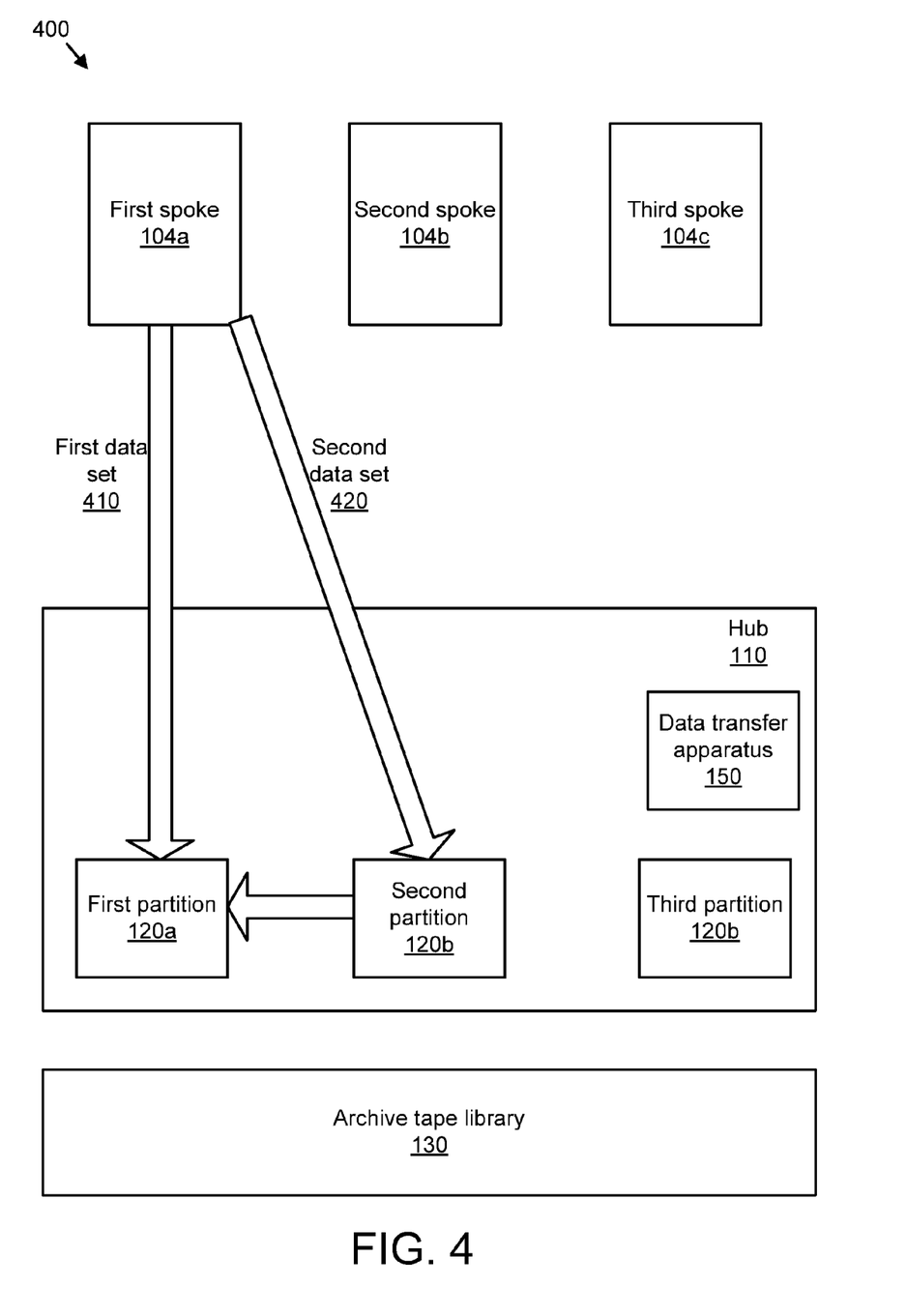
FIG. 4 is a schematic block diagram illustrating one embodiment of a system in which a data transfer apparatus affects storage of a first data set and a second data set.

FIG. 4 shows one embodiment of how data sets may be transferred in a system 400 that includes a hub 110 implementing a data transfer apparatus 150. The first spoke 104a may begin transferring a first data set 410 to a first partition 120a that is associated with the first spoke 104a. In certain embodiments, the first partition 120a is designated as the cache partition for the first spoke 104a. Thus, as data sets are offloaded from the first spoke 104a, they are transferred to the first partition 120a.

The first data set 410 may be successfully written to the first partition 120a. Once the first data set 410 has been successfully written, the data transfer apparatus 150 may power-down the first partition 120a. In certain embodiments, the first partition 120a is implemented using storage devices (such as hard disk drives) that are physically separate from the other partitions 120b-c in the hub 110. The storage devices of the first partition 120a may be spun down without affecting the storage devices of the other partitions 120b-c.

The hub 110 may receive a second data set 420 from the first spoke 104a while the first partition 120a is powered down. In certain embodiments, the data transfer apparatus 150 causes the second data set 420 to be written to a second partition 120b that is in power-on mode. The data transfer apparatus 150 may then monitor the first partition 120a and, in response to the first partition 120a entering the power-on mode, transferring the second data set 420 from the second partition 120b to the first partition 120a once the first partition 120a enters power-on mode. In certain embodiments, the actions of the hub 110 in redirecting the second data set 420 and moving it at a later time are hidden from the first spoke 104a such that the activity occurs transparent to the first spoke 104a.

The data transfer apparatus 150 may determine the size of the second data set 420 and compare it with a threshold data size. If the size of the second data set 420 exceeds the threshold data seize, the data transfer apparatus 150 may power-on the first partition 120a and write the second data set 420 directly to the first partition 120a. If the data set is smaller than the threshold value, the data transfer apparatus 150 may cause the second data set 420 to be written to the second partition 120b and later transferred to the first partition 120a as described above.

Figure 5:
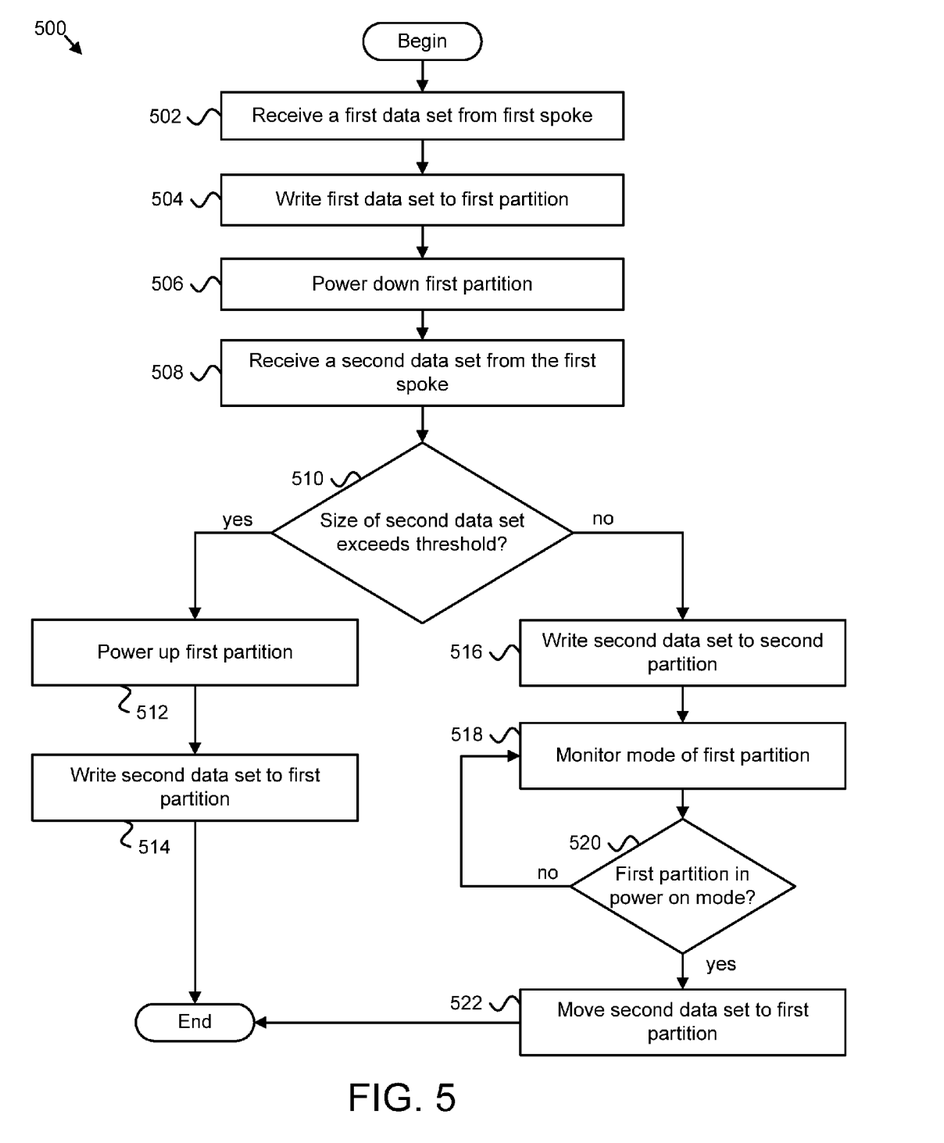
FIG. 5 is a flow chart diagram illustrating one embodiment of a method for power economization by powering down hub partitions.

FIG. 5 shows one embodiment of a method 500 for improved data transfer. In one embodiment, the method 500 begins with receiving 502 a first data set 410 from a first spoke 104a. The method 500 may also include writing 504 the first data set 410 to a first partition 120a that is associated with the first spoke 104a. In one embodiment, the first partition 120a is the default storage location for data sets generated by the first spoke 104a.

The first partition 120a may be powered down 506 after the first data set 410 is written to the first partition 120a. The method 500 may also involve receiving 508 a second data set 420 from the first spoke 104a and determining 510 whether the size of the second data set exceeds a threshold data set size.

If the second data set 420 exceeds the threshold data size, the method 500 may involve powering up the first partition 120a such that the first partition 120a is in power-on mode, 512. The method 500 may further involve waiting for the first partition 120a to power-on and writing 514 the second data set 420 to the first partition 514.

If the second data set 420 does not exceed the threshold data size, the method 500 may involve writing the second data set 420 to a second partition 120b that is physically separate from the first partition 120a and that is in a power-on mode, 516. The method 500 may also involve monitoring 518 the mode of the first partition 120a after the second data set 420 has been written to the second partition 120b. If it is determined 520 that the first partition 120a is in power-on mode, the second data set 420 is moved from the second partition 120b to the first partition 120a, 522. Moving the second data set 420 from the second partition 120b to the first partition 120a may involve writing the second data set 420 to the first partition 120a and deleting the second data set 420 from the second partition 120b.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer-readable storage medium storing computer readable program code configured to:
    power down a first partition of a hub comprising a plurality of partitions in response to writing a first data set from a first spoke of a plurality of spokes to the first partition such that the first partition is in a power-down mode, wherein the first partition is associated with the first spoke and each partition is associated with a spoke, each partition communicates with the associated spoke through a transmission control protocol accelerator that transfers data sets from each spoke to the associated partition with one of a parallel stack full offload, a host bus adapter full offload, and a chimney partial offload, each partition comprises first storage devices organized as a redundant array of independent disks (RAID), and the first spoke is three second storage devices joined in a grid with three-way failover;
    receive a second data set from the first spoke;
    write the second data set to a second partition of the hub in a power-on mode in response to the first partition being in the power-down mode and the second data set not exceeding a threshold data set size;
    transfer the second data set from the second partition to the first partition in response to the first partition entering the power-on mode; and
    power up the first partition of the hub such that the first partition is in the power-on mode and write the second data set to the first partition if the second data set exceeds the threshold data set size.

2. The computer program product of claim 1, further configured to determine whether the second data set exceeds the threshold data set size.

3. The computer program product of claim 1, wherein the hub is a component in a virtual tape hierarchy.

4. The computer program product of claim 1, wherein the first partition is implemented using first storage devices that are physically separate from one or more other partitions in the hub.

5. A method comprising:
    powering down, by use of a processor, a first partition of a hub comprising a plurality of partitions in response to writing a first data set from a first spoke of a plurality of spokes to the first partition such that the first partition is in a power-down mode, wherein the first partition is associated with the first spoke and each partition is associated with a spoke, each partition communicates with the associated spoke through a transmission control protocol accelerator that transfers data sets from each spoke to the associated partition with one of a parallel stack full offload, a host bus adapter full offload, and a chimney partial offload, each partition comprises first storage devices organized as a redundant array of independent disks (RAID), and the first spoke is three second storage devices joined in a grid with three-way failover;
    receiving a second data set from the first spoke;
    writing the second data set to a second partition of the hub in a power-on mode in response to the first partition being in the power-down mode and the second data set not exceeding a threshold data set size;
    transferring the second data set from the second partition to the first partition in response to the first partition entering the power-on mode; and
    powering up the first partition of the hub such that the first partition is in the power-on mode and writing the second data set to the first partition if the second data set exceeds the threshold data set size.

6. The method of claim 5, further comprising determining whether the second data set exceeds the threshold data set size.

7. The method of claim 5, further comprising transferring the first data set from the first spoke to the first partition.

8. A system comprising:
    a hub comprising a plurality of storage devices organized as a plurality of partitions, the hub comprising a first partition and a second partition, wherein the first partition is associated with a first spoke of a plurality of spokes and each partition is associated with a spoke, each partition communicates with the associated spoke through a transmission control protocol accelerator that transfers data sets from each spoke to the associated partition with one of a parallel stack full offload, a host bus adapter full offload, and a chimney partial offload, each partition comprises first storage devices organized as a redundant array of independent disks (RAID), and the first spoke is three second storage devices joined in a grid with three-way failover;

the hub further comprising an apparatus for improved data transfer, the apparatus configured to:

power-down the first partition of a hub in response to writing a first data set from the first spoke to the first partition such that the first partition is in a power-down mode;

receive a second data set from the first spoke;

write the second data set to the second partition of the hub in a power-on mode in response to the first partition being in a power-down mode if the second data set does not exceed a threshold data set size;

transfer the second data set from the second partition to the first partition in response to the first partition entering the power-on mode; and power up the first partition of the hub such that the first partition is in the power-on mode and write the second data set to the first partition if the second data set exceeds the threshold data set size.

9. The system of claim 8, further comprising one or more spokes, wherein each spoke is associated with one or more partitions of the hub.

10. The system of claim 8, wherein the hub is further configured to determine whether the second data set exceeds a threshold data set size.

11. An apparatus comprising:

a non-transitory computer readable storage medium storing computer readable program code executable by a processor, the computer readable program code comprising:

a power module powering down a first partition of a hub comprising a plurality of hubs in response to writing a first data set from a first spoke of a plurality of spokes to the first partition such that the first partition is in a power-down mode, wherein the first partition is associated with the first spoke and each partition is associated with a spoke, each partition communicates with the associated spoke through a transmission control protocol accelerator that transfers data sets from each spoke to the associated partition with one of a parallel stack full offload, a host bus adapter full offload, and a chimney partial offload, each partition comprises first storage devices organized as a redundant array of independent disks (RAID), and the first spoke is three second storage devices joined in a grid with three-way failover;

a monitor module receiving a second data set from the first spoke;

the monitor module further writing the second data set to a second partition of the hub in a power-on mode in response to the first partition being in a power-down mode and the second data set not exceeding a threshold data set size;

a transfer module transferring the second data set from the second partition to the first partition in response to the first partition entering the power-on mode; and the power module further powering up the first partition of the hub such that the first partition is in the power-on mode and write the second data set to the first partition if the second data set exceeds the threshold data set size.

* * * * *